United States Patent [19]
Chu et al.

[11] Patent Number: 5,561,976
[45] Date of Patent: Oct. 8, 1996

[54] REDUNDANT TRIP SOLENOID VALVE SHUT-OFF FOR GAS TURBINE FUEL SYSTEM

[75] Inventors: Henry G. Chu, Scotia; George Hubschmitt, Ballston Lake; Brian P. Ray, Clifton Park, all of N.Y.; Scott V. Annin, Greer, S.C.

[73] Assignee: General Electric Company, Schenectady, N.Y.

[21] Appl. No.: 322,623

[22] Filed: Oct. 13, 1994

[51] Int. Cl.$^6$ .................................................. F02C 7/232
[52] U.S. Cl. .......................................... 60/39.463; 60/734
[58] Field of Search ........................... 60/39.091, 39.281, 60/39.463, 734; 91/442, 444, 448

[56] References Cited

U.S. PATENT DOCUMENTS

| | | | |
|---|---|---|---|
| 2,559,814 | 7/1951 | Whittle | 60/39.463 |
| 3,168,810 | 2/1965 | Gatzemeyer et al. | 60/39.463 |
| 3,805,519 | 4/1974 | Plotnick et al. | 60/39.281 |
| 4,229,937 | 10/1980 | Smith | 60/39.281 |
| 4,446,377 | 5/1984 | Kure-Jensen et al. | |
| 4,708,594 | 11/1987 | Shinmei et al. | |
| 4,808,896 | 2/1989 | Katsuragi et al. | |

FOREIGN PATENT DOCUMENTS 62-255505  11/1987  Japan.

*Primary Examiner*—Louis J. Casaregola
*Attorney, Agent, or Firm*—Nixon & Vanderhye

[57] ABSTRACT

A trip oil system automatically controls the fuel shut-off valves in an industrial gas turbine. The trip oil system applies hydraulic pressure to actuate and hold open a fuel shut-off valve so that fuel flows to the combustor of the gas turbine. When the trip oil system relieves the hydraulic pressure, the fuel shut-off valve closes and stops the fuel flow to the combustor. A bank of three solenoid valves controls the application of hydraulic pressure to each fuel shut-off valve. Hydraulic fluid conduits interconnect the three solenoid valves such that no single valve by itself can relieve the hydraulic pressure applied to the fuel shut-off valve. During normal operation of the gas turbine, all three redundant solenoid valves are activated. For the trip oil system to cause the fuel shut-off valve to close, at least two of the solenoid valves must de-energize to relieve pressure to the fuel shut-off valve.

10 Claims, 3 Drawing Sheets

REDUNDANT TRIP SOLENOID VALVE SHUT-OFF FOR GAS TURBINE FUEL SYSTEM

FIELD OF THE INVENTION

This invention relates to fuel controls for gas turbines and, particularly, to trip oil fuel shut-off systems for industrial gas turbines.

BACKGROUND AND SUMMARY OF THE INVENTION

Most industrial gas turbines have an automatic fuel shut-off system to stop fuel flow to the combustor(s) of the gas turbine. Such automatic fuel shut-off systems stop fuel flow when an emergency or abnormal operating condition is detected in the gas turbine. The automatic fuel shut-off system is also used to close an inactive fuel supply in favor of an active fuel supply, when the gas turbine has dual-fuel supplies. A common automatic fuel shutoff system is a trip oil system that hydraulically controls the fuel shut-off valves for a gas turbine. The current invention relates to improvements to a trip oil system.

The fuel shut-off valves of an industrial gas turbine typically are biased closed to prevent fuel flow unless an actuating force is applied to the valve. This actuating force is provided by the hydraulic fluid pressure supplied by a trip oil system. During start-up and operation of the gas turbine, trip oil systems apply hydraulic fluid to actuate and hold open fuel shut-off valves so that fuel flows to the combustors of the gas turbine. The trip oil systems relieve hydraulic pressure to allow the shut-off valves to isolate an unused fuel supply in a dual fuel supply system or stop fuel flow altogether if certain problems are detected in the gas turbine. Such failures and problems can include an overspeeding turbine, flame-out or abnormal turbine temperature.

Trip oil systems must operate reliably and consistently to ensure the uninterrupted normal operation of an industrial gas turbine. Fuel flows to an industrial gas turbine only if a fuel shut off valve is held open by the trip oil system. If the hydraulic pressure from the trip oil system needed to hold open a fuel shut-off valve is not being applied because the trip oil system becomes inoperative or because the trip oil system needs to be tested or requires maintenance, then the fuel shut-off valve closes and the gas turbine stops. Stopping a gas turbine because of a malfunction, testing or maintenance of the trip oil system is a highly undesirable feature of prior art trip oil systems. In prior art trip oil systems, the failure, testing or maintenance of a single trip oil valve causes a fuel shut-off valve to close and stop an industrial gas turbine. Such interruptions in the operation of an industrial gas turbine are highly undesirable, and have been a long-term problem with prior trip oil systems. For example, FIG. 3 shows a prior art trip oil system having a single individual trip oil valve 90 for each branch of the trip oil conduits. If this one trip oil valve fails or requires service, then the associated fuel shut-off valve 92 stops the fuel flow to the combustor.

There has been long-felt need for an improved trip oil system that is extremely reliable, and can be tested and serviced while the gas turbine is operating. Prior trip oil systems have not satisfied this need. The current invention is an improved trip oil system that can be tested and serviced without interrupting operation of the gas turbine. One feature of the invention is that redundant trip oil valves have been substituted for the single, isolated valves of prior systems. Similarly, the current invention includes redundant components so that a failure in any one trip oil valve will not result in fuel shut-off to an industrial gas turbine, thereby causing the gas turbine to shut down.

Even worse, if the single trip valve of the prior art system does not react to a signal from a controller 94 to shut off the fuel flow then fuel will continue to flow to the gas turbine and the continued operation of the gas turbine could cause damage. To detect a defective trip oil signal, it is known to employ redundant pressure sensors 96 to notify the controller 94 that the trip oil valve relieved pressure in its respective branch of the trip oil conduit system. If the controller is notified by two out of three pressure sensors that the trip oil pressure is high after the trip oil valve has been commanded to relieve pressure, then the controller acts to shut off the gas turbine. If only one pressure sensor indicates that the pressure is still high, a fault signal is generated by the controller to signal a defect, probably in the pressure sensor, in the trip oil system.

DETAILED DESCRIPTION OF THE DRAWINGS

Figure 1:
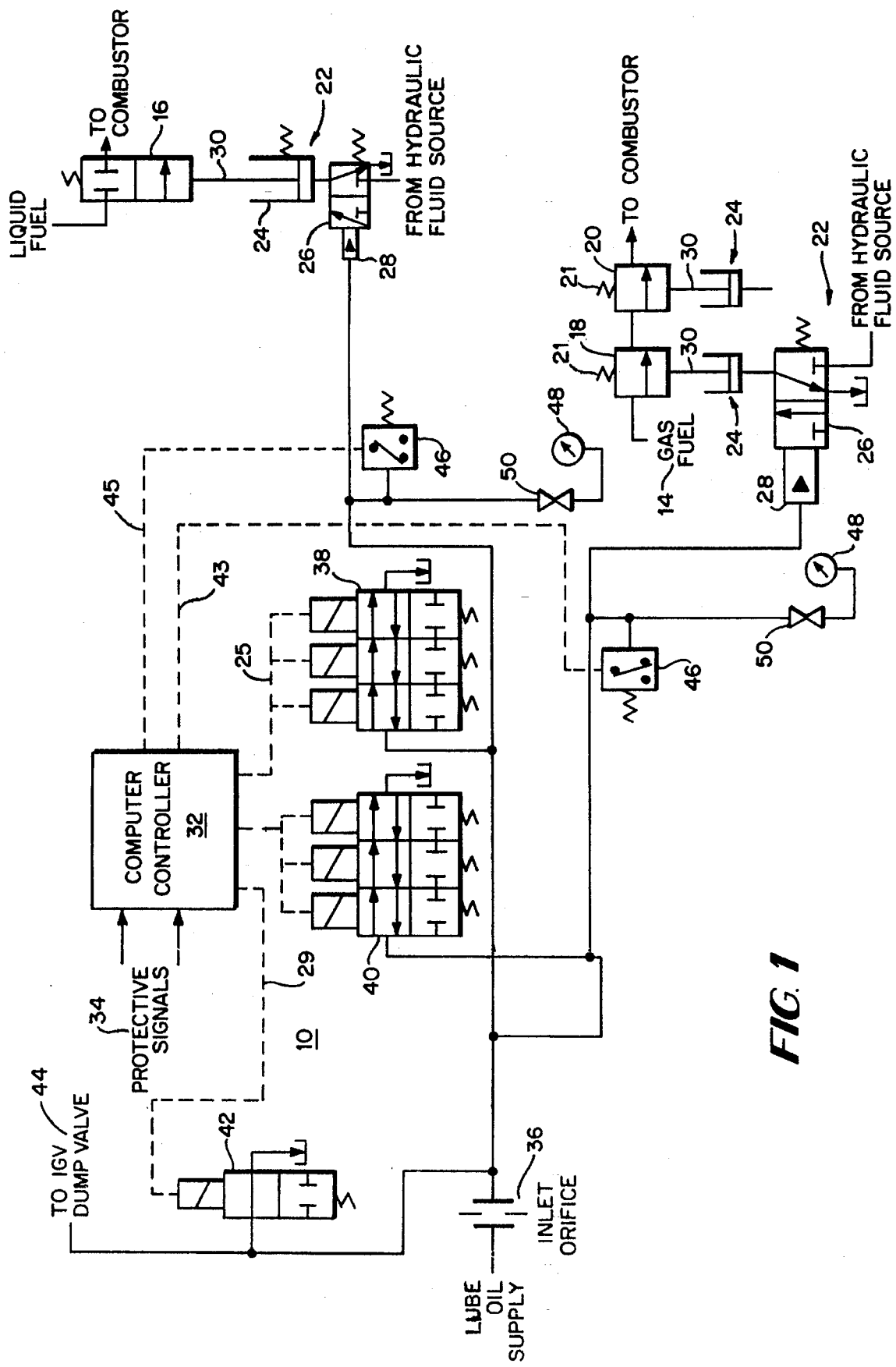
FIG. 1 is a schematic flow diagram of an exemplary dual-fuel system for a gas turbine made in accordance with a preferred embodiment of the invention.

FIG. 1 shows an trip oil system 10 for a dual-fuel industrial gas turbine that is the preferred embodiment of the current invention. Liquid fuel for the gas turbine is supplied from a liquid fuel supply 12, and gas is supplied via gas fuel supply 14. The invention is not limited to a liquid/gas dual-fuel system and is equally suited to single fuel systems and systems for supplying other types of fuel. Each fuel supply is primarily a conduit that carries fuel from a fuel source to the combustor of the gas turbine.

For purposes of the current invention, the relevant portion of the fuel supply are the fuel shut-off valves and trip oil system. Liquid fuel shut-off valve 16 is positioned in the conduit for liquid fuel and gas fuel shut-off valve 18 is positioned in the conduit for gas fuel. These shut-off or stop valves are shown schematically in FIG. 1 in an inactive (closed) position, as are all switchable components, e.g., valves and actuators, shown in the figures. In the fuel supply conduits downstream of these shut-off valves are control valves 20 for the gas fuel supply and control pumps with bypass conduits (not shown) for the liquid fuel supply. These control valves and pumps regulate the flow of fuel to the combustor of the gas turbine.

Liquid or gaseous fuel is supplied via the dual-fuel system to fuel nozzles in the combustion section of the gas turbine. The fuel from the nozzles is mixed with compressed air from a compressor and the mixture is burned in the combustion section. The hot combustion gases flow from the combustion section through a turbine where energy from the exhaust gases powers rotating blades in the turbine. The rotation imparted to the turbine is used to power the compressor and provide external usable mechanical power.

In the exemplary embodiment shown in FIG. 1, the shut-off valve 16 for liquid gas is a two-position, on/off valve, and the shut-off and control valves 18, 20 for gas fuel are modulated valves that may each be used to regulate the flow of gaseous fuel to the combustor. Whereas gas fuel is usually regulated by modulated valves, the flow of liquid fuel is generally regulated by a control pump and by-pass conduit system. The particular type of fuel shut-off valves will depend on the application in which the valves are used.

Each shut-off valve 16, 18 (and the control valve 20) is biased to a closed position so that the flow of fuel to the combustor is stopped absent an actuating force to overcome the biasing force on the valve. The shut-off valve and control valve biasing forces are schematically represented by springs 21. To overcome the valve biasing force, each shut-off valve has an associated valve actuator 22 that opens the valve when energized. In the preferred embodiment, the actuator is energized by the application of hydraulic fluid pressure from the trip oil system, although other means for energizing an actuator may be employed. Each valve actuator may include, for example, an actuator piston 24, a dump relay valve 26 and a trip oil booster piston 28. The actuator piston is attached to a connecting rod 30 which at an opposite end is connected to the associated fuel shut-off valve. As the piston moves within a sleeve in the actuator, the connecting rod causes the shut-off valve to be switched from an open to a closed position or vice versa. If the actuator 22 is connected to a modulated stop or control valve, then the position of the piston in its sleeve will control the operating position of the valve via the connecting rod 30.

When trip oil activates a booster piston 28, the corresponding dump relay valve 26 directs hydraulic fluid into a piston chamber 24 which pushes a piston outward which in turn activates the valve coupled to the piston rod. With respect to the stop valves for the liquid and gas fuel supplies, the movement of the booster piston resulting from trip oil entering the piston chamber causes the fuel stop valves to open and allows fuel to flow through the valve towards the combustor.

The operation of the gas turbine is constantly monitored and controlled by sensors and controllers 32. The sensors are displaced throughout the gas turbine, and may include speed sensors detecting the rotational speed of the central shafts in the gas turbine, pressure and thermal sensors in the compressor, combustion section and turbine, ignition sensors in the combustion section and many other types of sensors that are conventional and well known to those skilled in gas turbines. The signals 34 from these sensors are fed to controllers that are schematically represented as a single controller 32 (although the controllers may be distributed throughout the gas turbine). In the context of this invention, the controller receives protective signals 34 from sensors and other devices monitoring the gas turbine which detect abnormal operating conditions, component failures and other problems with the gas turbine.

These protective sensor signals 34 are supplied to the controller 32 which acts in response to the signals. The structure and operation of the controller is conventional and well-known. The controller is operatively coupled (via dotted lines 25, 27 and 29) to trip oil valves manifolds 38, 40, 42, respectively, in the fuel system. These connections may be electrical, hydraulic, electromechanical or any other coupling that allows the controller to operate the trip oil valves or otherwise control the flow of fuel to the combustion section of the gas turbine. The controller is set up or programmed (if computerized) to respond to certain protective sensor signals or certain combinations of these protective signals. In response to certain sensor signals, indicative of a problem(s) in the gas turbine, the controller will cause the trip oil system to shut off fuel to the combustor and stop the operation of the gas turbine.

In operation, hydraulic fluid under pressure is provided to the conduits of the trip oil system. This hydraulic fluid may be lubricating oil diverted from a lubricating oil system for the gas turbine or provided from another source of hydraulic fluid. The inlet orifice 36 isolates hydraulic fluid pressure drops in the trip oil system from the lubricating oil system. A sufficient flow of hydraulic fluid passes through the inlet orifice to activate the trip oil system, but the flow of fluid through the inlet orifice is restricted to prevent having the trip oil system depressurize the lubricating oil system. Because of the inlet orifice, the trip oil valve manifolds 38, 40, 42 can relieve the trip oil pressure without causing a significant drop in lubricating oil pressure.

Hydraulic fluid (trip oil) is conveyed by conduits to the trip oil valve manifolds 38, 40 for the two fuel supplies and valve manifold 42 for the inlet guide vanes (IGV) of the gas turbine. Each of these trip oil valve manifolds is similar in structure, but is independently operated by the controller. When energized, each trip oil valve manifold maintains hydraulic pressure in its associated branch of the trip oil system. When de-energized, the trip oil manifold relieves hydraulic pressure in its associated branch by routing hydraulic fluid to a drain. As long as pressure is maintained by the respective trip oil valve manifold in its branch of the trip oil conduits, the booster solenoid 28 for the associated relay valve 26 causes the respective actuator 22 to hold open the fuel stop valve 16 or 18.

Moreover, the trip oil valve manifold 42 for the inlet guide vane (IGV) maintains pressure in the trip oil conduit that causes the IGV dump valve 44 to be held open, in a manner similar to the fuel stop valves, unless the trip valve 42 is de-energized with a controller signal such that trip oil pressure is relieved in the conduit branch applicable to the IGV dump valve.

The hydraulic pressure in each branch of the conduits for the trip oil system is monitored by the controller 32 via connections 43, 45. The controller activates a pressure switch 46 coupled to the respective conduit branch. The pressure switch activates a pressure gauge 48 that can be read manually or automatically monitored by, for example, the controller. A restriction orifice 50 reduces the trip oil flow to the pressure gauge to prevent damage to the gauge.

Figure 2:
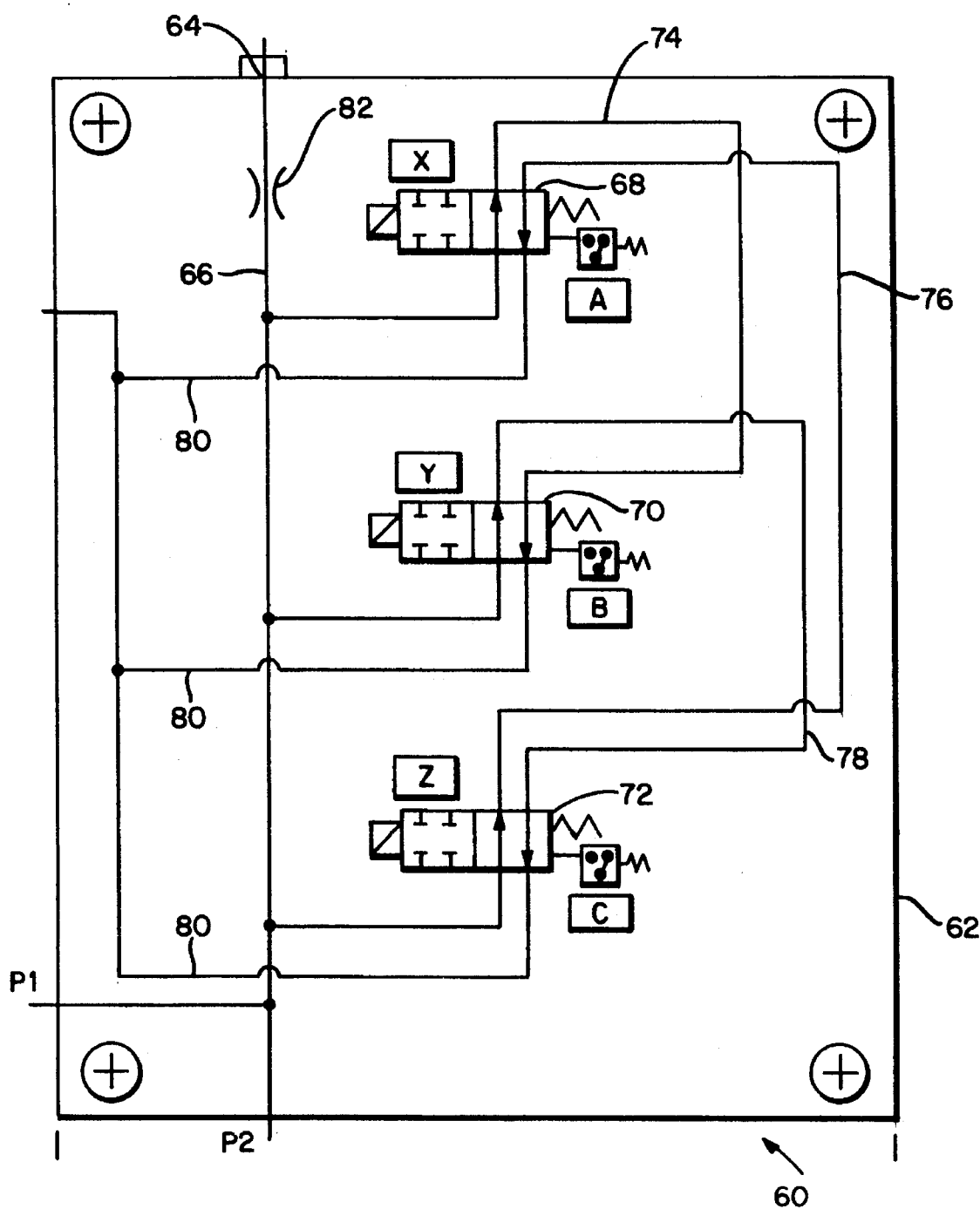
FIG. 2 is a block diagram of a triple-redundant trip oil valve arrangement for use with a preferred embodiment of the present invention.
Figure 3:
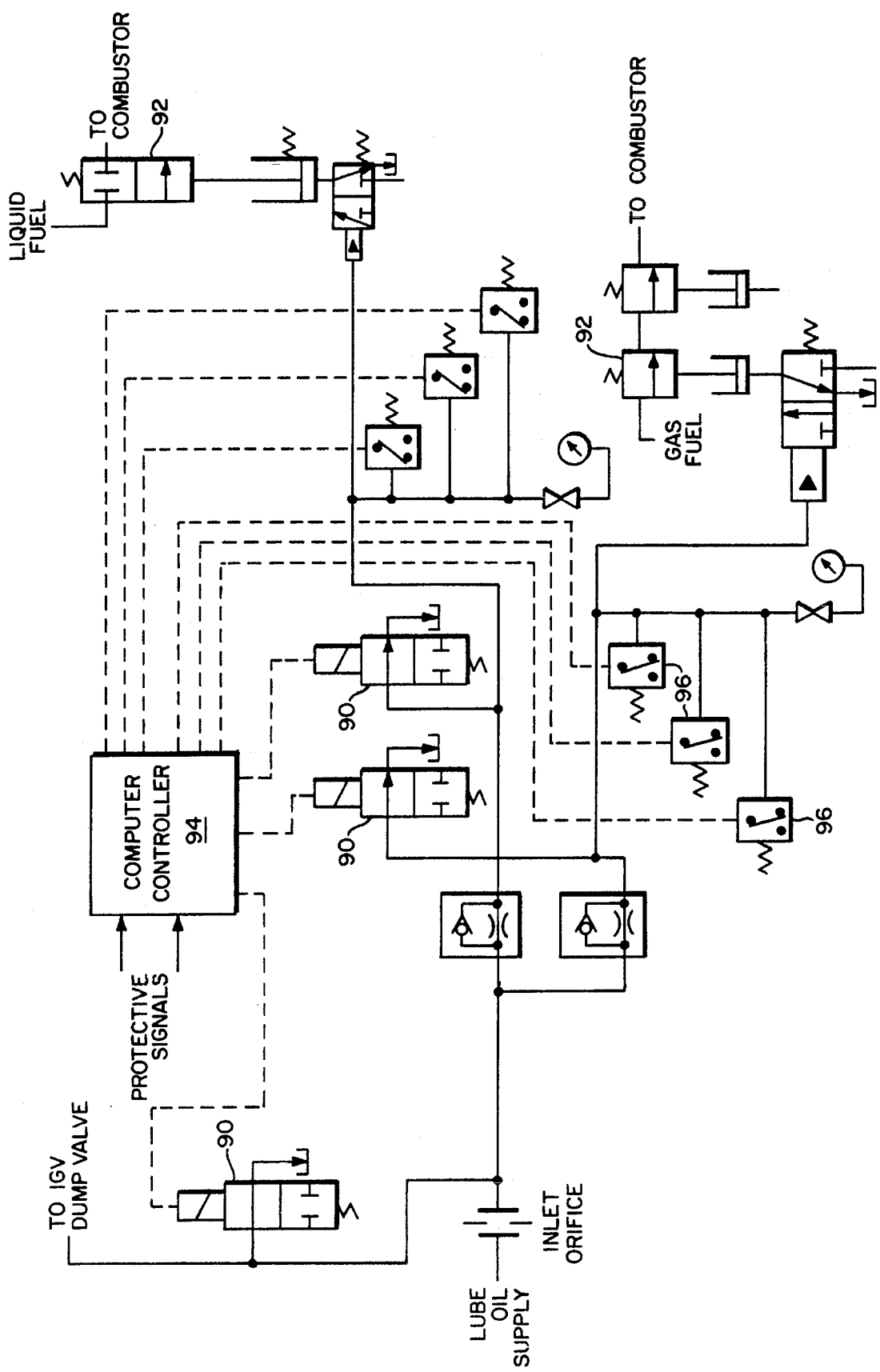
FIG. 3 is a schematic flow diagram of a fuel system for a gas turbine having a prior art trip oil system.

As shown in FIG. 2, an exemplary trip oil valve manifold 60 includes a frame assembly 62 that is mounted to a structure associated with the gas turbine. Supply conduits for trip oil (hydraulic fluid) attach to an inlet port 64 on the manifold. This inlet port connects the trip oil conduits to the oil passages on the frame assembly.

The fluid passages on the frame assembly include main passages 66 for directing trip oil to the trip oil valves 68, 70, 72 bypass passages 74, 76, 78 interconnecting the trip oil valves, and drain passages 80 for draining the hydraulic pressure to relieve trip oil pressure. Drain passages 80 are manifolded together. As illustrated, the trip oil valves each have a pair of ports through which trip oil can pass. Each bypass passage is connected to an outlet port of one trip oil valve and an inlet port of another valve. The manifolded outlet of the drain passages is connected to a reservoir for hydraulic fluid. The main passages in the valve manifold are connected to the manifold inlet 64 and two manifold outlets P1 and P2. The first manifold outlet P1 is available for connecting control system instrumentation which may be used to monitor the hydraulic pressure in the trip oil system. The second manifold outlet P2 is the main connection which supplies the trip oil system equipment downstream of the manifold with pressurized hydraulic fluid.

An orifice 82 is located along the main fluid passageway 66 near the manifold inlet 64. This restricted flow orifice isolates the hydraulic fluid pressure upstream of the manifold 60 from the trip oil pressure downstream of the manifold. When the trip valves on the manifold divert hydraulic fluid to the drain and, thus, reduce the fluid pressure in and downstream of the manifold, the orifice prevents a significant fluid pressure drop upstream of the manifold in the trip oil system. The orifice 82 restricts fluid flow into the manifold, but allows a sufficient flow of fluid so that the trip valves will trigger the associated relay valves 26, 42 when the trip valves divert hydraulic fluid to a drain.

Trip oil valves 68, 70, 72 are redundant. Each valve has an open position which allows hydraulic fluid to pass through the valve to a drain, and a closed position that does not allow the passage of hydraulic fluid. Each of the trip oil valves is a four-way valve in that there are two fluid paths through the valves and both paths are either open or closed. One exemplary four-way trip oil valve is a closed center, spool valve such as manufactured by the Denison Division of Abex Corp. in Columbus, Ohio and by Mitten Hydraulics Inc. of Syracuse, N.Y.

When at least two of the trip oil valves are closed, then hydraulic pressure is maintained in the trip oil system and the fuel shut-off valves are open to allow fuel to flow. If any two of the trip oil valves are open, then trip oil drains through the valves to relieve hydraulic pressure and shut off the fuel flow. Each valve is activated by a solenoid that, when energized, moves the valve from an open (as shown in FIG. 2) to a closed position. The valves are biased to an open position by a spring. In their open positions, the valves pass hydraulic fluid to a drain and thereby relieve trip oil pressure to trip the associated fuel shut-off valves. The solenoid actuators for each top oil valve are electromechanically operated by the controller.

The invention has been described in terms of what is considered to be the most practical and preferred embodiment. It should be understood that the invention is not to be limited to this disclosed embodiment. Rather, the invention covers the various modifications and equivalent arrangements included within the spirit and scope of the appended claims.

What is claimed is:

1. In a fuel supply coupled to a combustor in a gas turbine, a trip oil system comprising:

an actuator operatively coupled to a fuel valve in said fuel supply, said actuator having a first position that holds open the fuel valve so that fuel flows through the fuel supply to the combustor and a second position that shuts off the flow of fuel in the fuel supply to the combustor, a trip oil conduit connected to said actuator wherein the actuator is disposed to said first position by the application of hydraulic pressure from the conduit;

a redundant trip oil valve manifold having a plurality of trip oil valves connected to the conduit, each of the trip oil valves having an open position open to the flow of hydraulic fluid and a closed position closed to the flow of hydraulic fluid, said trip oil valves being interconnected in pairs such that at least two interconnected valves must be mutually in the open position for hydraulic fluid to flow through the valves; and wherein said manifold relieves hydraulic pressure in the conduit when at least two of said plurality of trip oil valves are in the open position and said actuator is disposed to said second position when pressure is relieved in the conduit.

2. A trip oil system as in claim 1 wherein the redundant trip oil valve manifold further comprises trip oil valves having dual fluid passages and both said dual fluid passages are open to fluid flow when the valve is in said open position and both said passages are closed to fluid flow when the valve is in said closed position.

3. A trip oil system as in claim 1 wherein each of said trip oil valves includes a first fluid passage connected to a fluid passage on a second of said trip oil valves, and a second fluid passage connected to a fluid passage on a third of said trip oil valves.

4. A trip oil system as in claim 1 wherein each of said trip oil valves is biased to said open position.

5. A trip oil system as in claim 1 wherein each of said trip oil valves is operatively coupled to a controller for the gas turbine and the controller commands at least two of said trip oil valves to move to said open positions after the controller detects a fault in the gas turbine.

6. A method for controlling the flow of fuel to a gas turbine having a fuel supply conduit with a fuel valve, a controller, and a trip oil system including an actuator coupled to the fuel valve, a fluid conduit connected to the actuator and three interconnected trip oil valves disposed in the fluid conduit, said method comprising the steps of:

a. setting the trip oil valves in a closed position to cause pressure in the fluid conduit to attain at least a level sufficient to activate the fuel valve;

b. passing fuel through the fuel supply when the fuel valve is activated by pressure in the fluid conduit;

c. maintaining pressure in the fluid conduit when just one of the trip oil valves moves to an open position which would allow fluid to pass through the trip oil valve;

d. reducing pressure in the fluid conduit when two or more of the trip oil valves move to an open position, and e. deactivating the fuel valve when pressure is reduced in step (d) so as to cause the flow of fuel to the gas turbine to diminish.

7. A method as in claim 6 wherein in step (e) the flow of fuel is stopped by the deactivated fuel valve.

8. A method as in claim 6 wherein step (d) is further accomplished by diverting fluid pressure from the open trip oil valves to a drain.

9. A method as in claim 6 wherein step (d) is performed in response to a command signal received from a gas turbine controller that has determined that a fault has occurred in the gas turbine.

10. In a fuel supply coupled to a gas turbine, a trip oil system comprising:

an actuator operatively coupled to a fuel shut-off valve in said fuel supply, said actuator having a first position that opens the fuel shut-off valve to the flow of fuel to the gas turbine and second position that shuts off the flow of fuel to the gas turbine;

a trip oil conduit connected to said actuator to apply an activating force to the actuator to switch the actuator to the first position;

a trip oil valve manifold having a plurality of trip oil valves, each of said trip oil valves having first and second passages, the first passage being connected to the conduit and the second passage of another trip oil valve and the second passage being connected to a fluid drain, wherein each of said trip oil valves having an open position in which fluid can flow through the first and second passages and a closed position that prevents fluid flow through the passages, and where said manifold relieves hydraulic pressure in the conduit when at least two of said trip oil valves are in the open position and said actuator is disposed to said second position when pressure is relieved in the conduit.

\* \* \* \* \*